April 23, 1940.   M. HANDMAN   2,198,558
CLIP BROOCH ASSEMBLAGE
Filed July 9, 1936
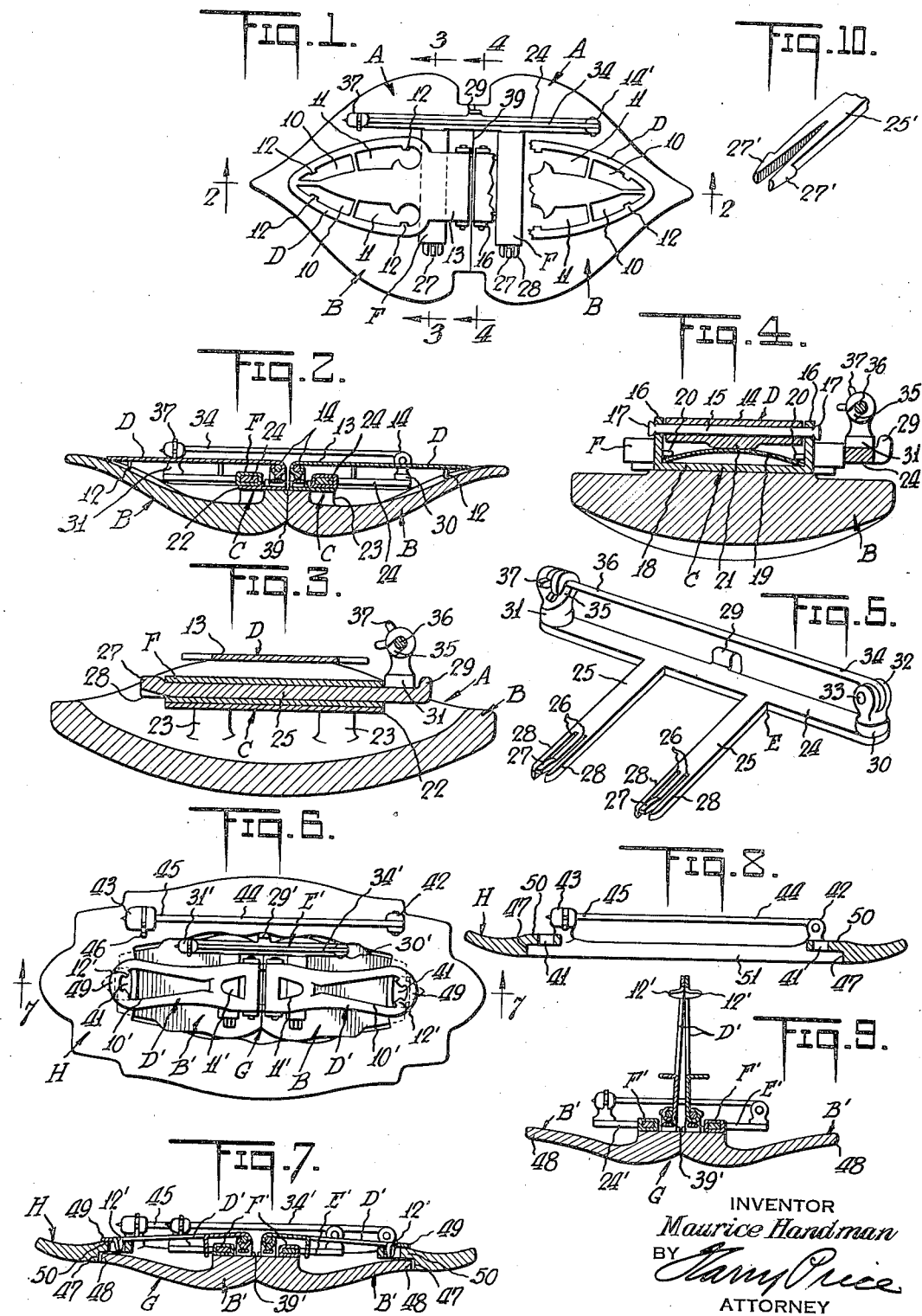
INVENTOR
*Maurice Handman*
BY
*Harry Price*
ATTORNEY Patented Apr. 23, 1940

2,198,558

UNITED STATES PATENT OFFICE 2,198,558

CLIP BROOCH ASSEMBLAGE

Maurice Handman, Providence, R. I., assignor to Albert Weiner, Providence, R. I.

Application July 9, 1936, Serial No. 89,725

21 Claims. (Cl. 63—20)

The present invention relates to a clip brooch assemblage, particularly adapted for women's wear, which may be dismantled into a pair of clips.

In designing assemblages of this character it is most important that the combination be readily assembled or dismantled without difficulty by the wearer thereof, who is usually not most skilled in mechanics, and it is also most desirable that the assemblage be of such character that the clips will not tend to loosen or rattle when they are attached in position to form the brooch.

It is therefore among the objects of the present invention to provide an improved clip brooch assemblage which may be readily assembled or dismantled by the wearer thereof, and which when assembled will not tend to fall apart or become loose.

A disadvantage often encountered in clip brooches arises from the fact that a great many are designed with positive locking means to rigidly secure the clips in position which necessitates proper and exact positioning together of a frame member and of a locking member upon the clip, and often when proper adjustment or assemblies are not made this rigid securing means will not function properly permitting the clips to become loose.

It is therefore among the further objects of the present invention to provide a clip brooch assemblage of the character described which is substantially devoid of locking means and which will automatically place itself in position in the brooch assemblage without need for the wearer to align most carefully the various component parts thereof or to secure them rigidly together.

It is a further object of the present invention to provide a simple frame construction, inexpensive to manufacture and which may be readily concealed by the clip assemblage in forming the brooch, which frame may be readily stamped or formed from sheet metal without difficulty, and which frame, although of light weight, will most satisfactorily and rigidly support the clips in a brooch assembly.

Another object is to provide an improved clip brooch assemblage in which the clips will be designed to be assembled on the frame with a minimum of change in their construction with the result that substantially standard finding, mounting and ornamental constructions may be employed in making the clips.

Another object is to provide a clip brooch assemblage in which the frame and component clips may be assembled together independent of the jaw members of the clips, which jaw members may be closed or opened without loosening or dismantling the assemblage.

Other objects will be obvious or will appear during the course of the following specification.

In accomplishing the above objects it has been found most satisfactory in one embodiment to provide a branch frame, for example a T-frame, in which the top of the T will carry the pin and catch for mounting the brooch. A multiple or double stem or leg will be provided on the T, each stem to engage one of the clips.

According to the preferred construction, the mounting members or ornaments of the clips are designed to receive a flat tubular receiver member to engage the stems or legs of the T-frame, these flat tubes being positioned slightly to the inside of, and parallel to, the pivot of the mounting member. The end of the T is preferably slit so as to form resilient tongue members, which by their resiliency will afford sufficient friction to prevent ready removal of the clips from the frame, when the brooch assemblage is being utilized.

If desired the clip brooch assemblage including its T frame may be assembled on another or encircling ornamental member which is designed to cooperate with the clips to hold the first brooch assemblage in position. In such a case the second ornamental member may carry a pin and catch mounting, by which the entire assemblage may be attached to an article of apparel or to a mount or to a display stand.

In the drawing which illustrates several embodiments of the invention by way of illustration, but not by way of limitation, it being understood that many changes and modifications in the specific forms shown are possible:

Fig. 1 is a rear view of the brooch assemblage with the outline of the ornamental members being shown and with the jaw member of one of the clips being particularly broken away to show the receiving tube for the stem of the T-frame;

Fig. 2 is a longitudinal sectional view upon the line 2—2 of Fig. 1 of the clip brooch assemblage;

Figs. 3 and 4, respectively, are transverse sectional views upon the lines 3—3 and 4—4 of Fig. 1 upon enlarged scale of the clip brooch assemblage;

Fig. 5 is a perspective view of the T-frame removed from the clip brooch members upon a slightly enlarged scale;

Fig. 6 is a rear view of an alternative embodiment showing the combination of a clip brooch assemblage, with an ornamental frame, the ornamental members of the clips and the ornamental frame being shown in outline;

Fig. 7 is a longitudinal sectional view upon the line 7—7 of Fig. 6 showing the clip brooch assemblage of Fig. 6;

Fig. 8 is a longitudinal sectional view similar to Fig. 7 of the ornamental frame, with the clip brooch assemblage removed;

Fig. 9 is a transverse sectional view similar to Fig. 7 of the clip brooch assemblage with the jaw members of the clips elevated, illustrating the manner in which the clip brooch assemblage of Fig. 9 may be combined with the ornamental frame of Fig. 8; and Fig. 10 is a fragmentary view of the end of the stem of the frame member showing a modified resilient construction.

Referring to the embodiment of Figs. 1 to 5, there are provided two clip members A, having ornamental faces B, attached preferably by soldering to mounting members C, which are pivotally connected to the jaw members D.

The assembly frame E cooperates with the tubular receiver members F, which are preferably rigidly connected to the mounting members C or the ornaments B.

The ornamental members B, shown in Figs. 1 to 4 in mere outline and in section, are usually castings or die castings suitably plated with chromium, nickel or silver, and provided upon their faces with various ornamental skeleton piercing or rhinestone arrangements and so forth.

The mounting and jaw members C and D, respectively, are usually purchased already assembled by the jewelry manufacturer from the finding manufacturer. The jewelry manufacturer assembles these structures C—D to the ornamental members B by soldering the mounting members thereto.

In Figs. 1 to 4 is shown one typical form of a jaw and mounting assembly C and D, termed a clip or clasp finding, in which the jaw member has been suitably formed with cut out portions 10 and 11 which give an artistic effect therein and which permit the formation of the teeth 12 designed for clipping the dress or other article to which the clips may be attached. The rear portion 13 (see Fig. 1) of the jaw member D is of decreased width and is rolled over as indicated at 14 to receive the pivot pin 15 (see particularly Fig. 4), which pivot pin 15 extends through holes in the ears 16 of the mounting member C.

The ends of the pivot pin 15 (see Fig. 4) are enlarged at 17 so as to fix the pivot pin in position. The base of the mounting member 18 is soldered to the facing ornament B. Boxed between the ears 16 is the flat spring 19 which is held in position by the inturned portions 20 of the mount C. The flat spring 19 as indicated best in Fig. 4 is bowed upwardly and the embossment 21 on the round or turned portion 14 cooperates with said spring to tension and cause the jaw members D to move either into open or into closed position.

In the particular embodiment shown in Figs. 1 to 4 the mounting member is provided with an extension 22 which receives the flattened tube F cooperating with the frame member E. If desired, however, this tube F may be directly soldered to the ornament structure B itself instead of being soldered to the mounting member. On the other hand, the mounting member C may be turned over to form said tube integrally.

Generally the spacing between the base 18 and the jaw D is such that there will be sufficient space for the flat tubular member F, the jaws D being stopped by contact of the teeth 12 with the ornament B before the jaw member D contacts with the flattened tubular members F. It is generally desired to additionally support the mounting member extension 22 and for this purpose the elevations or bosses 23 are provided on the back of the ornament member B to receive the tube F, as indicated best in Fig. 3.

The frame, shown by itself in Fig. 5 and in assembly in Figs. 1 to 4, consists of a head 24 and two stems 25. The lower ends of the stems are slit as indicated at 26 and the middle portions are turned upwardly as indicated at 27 to form a central tongue offset from the outer portions 28. This will give a frictional grip when the stems 25 are inserted into the flattened tubular members F.

The cross member 24 is provided with an ear 29, which may afford a stop or serve as a contact. To the ends of the bar or head 24 are attached by soldering or welding the pin stem joint 30 and the catch 31. The pin stem joint is provided with ears 32 through which extends the pivot pin 33, said pivot pin affording the pivot mount for the main holding pin 34. The catch 31 has a recess 35 which receives the end 36 of the main holding pin 34 and is provided with a lock 37 to hold said end in position.

In assemblage with the jaws D open or closed as may be desired, the clips A may be slipped upon the frame E by inserting the stems 25 into the tubular members F. The ornaments B are preferably positioned so that their inside edges will abut as indicated at 39 or interfit one another. The offset tongues 27 and 28 at the ends of the stems 25 will insure a frictional grip of the stems 25 in respect to the tubular members F and will hold the clips in position on the frame E when the clip brooch assemblage as shown in Figs. 1 to 4 is being utilized. It will be noted that the frame E may be stamped out of sheet metal, is relatively inexpensive to manufacture and is of light weight not substantially increasing the weight of the assemblage of Figs. 1 to 4.

In addition it is most readily removed from or assembled with the clips A. The jaw members D do not have any locking or securing function and it is not necessary to manipulate the jaws D to lock or unlock the clips in respect to the frame E. The pin and catch assemblage 30 and 31 is readily available in the structures of Figs. 1 to 4 and may be manipulated to enable attachment of said assemblage to apparel, and so forth. When the clips A are dismantled the jaw members D may be utilized in the usual fashion to attach said clips to garments or wearing apparel without any interference because of the flat tubular elements F.

It will be noted that the clips A are held solely in position by reason of the frictional grip of the tongues 27 and 28 in respect to the tubes F and that the clips are never locked or rigidly secured in position, but may always be removed by exerting pulling thereupon without the need of releasing interlocking or securing devices.

In the device of Figs. 6 to 10 the clip brooch assemblage G is of similar construction and operation as the clip brooch assemblage of Figs. 1 to 4, similarly functioning elements being indicated by the same numerals primed.

The differences between the assemblage G of Figs. 6 to 9, are best shown in Fig. 10, however; the stem members 25' of the frame E' are slit and extended laterally. The middle portion of the stem 25' is cut away at the end of said stem and the side tongues 27' are provided with enlargements which frictionally grip the sides of the flattened tubes F'. The outer ornamental frame H is provided with recesses 41, which as best shown in Fig. 7 are designed to receive the outermost teeth 12' of the jaw members D' to hold the inside assemblage G in position in said frame H.

The frame as indicated best in Fig. 6, is provided with a pin stem joint 42, a lock 43, and a pin 44, the end of the pin at 45 being adapted to be locked in position by the swinging element 46. It will be noted by referring to Fig. 7, that the frame member is provided with recesses 47 which receive the ends 48 of the ornaments B'. The ends 49 of the jaw members D' fit against flats 50 on the back of the ornamental frame H. The combination G itself may be dismantled or assembled in the manner already described in connection with Figs. 1 to 4.

The assembling or dismantling the arrangement G in respect to the frame H the jaw members D' are turned into the position indicated in Fig. 9. Then the assemblage G is moved upwardly into the opening 51 in the frame as best shown in Fig. 8. Only the ends 48 of the ornaments B' will lodge in the recesses 47. When this has been accomplished the jaw members G may be snapped down and the teeth 12' will engage the openings 41 to obtain the assemblage as shown in Figs. 6 and 7.

It is thus apparent that the assemblage shown in Figs. 1 to 4 adapts itself most readily to be arranged in other assemblages and if desired by providing additional number of legs 25 upon the frame E, an additional number of clips may be assembled therewith or a combination of earrings, pendants and other ornamental devices may be obtained in one brooch.

The ornaments of the clips in all cases are suitably formed to closely fit against the other clip members in the manner indicated at 39 in Fig. 1 or 2 or 39' in Figs. 7 and 9. The present application is similar in subject matter to application Serial No. 42,726, filed September 30, 1935, now Patent No. 2,120,215 and application Serial No. 89,726, filed July 6, 1936, now Patent No. 2,120,216.

The invention however is not intended to be restricted to any particular construction or arrangement of parts or to any particular application of any such construction or to any specific method of assemblage or manner of use, or to any of the various details thereof, herein shown and described as the same may be modified in various particulars or be applied in many varied relations without departing from the spirit and scope of the claimed invention, the practical embodiments herein illustrated and described merely showing some of the various features entering into the application of the invention.

I claim:

1. In an article of jewelry, the combination of a skeleton frame having a plurality of leg members and clasp members adapted to be received upon said leg members and frictionally held in position thereon, said clasp members having ornaments and jaw members pivotally connected thereto and also having receiver means extending parallelly of the pivotal connections between the jaw members and the ornaments to engage said leg members.

2. In an article of jewelry, the combination comprising a frame, said frame being provided with a plurality of parallel leg members and a plurality of clasp members to be fitted upon said leg members, each said cooperating clasp member and leg member being provided with a frictional engagement, said frictional engagement consisting of a tubular element on the clasp member frictionally receiving said leg member.

3. In an article of jewelry, the combination comprising a frame, said frame being provided with a plurality of leg members and a plurality of clasp members to be fitted upon said leg members, each said cooperating clasp member and leg member being provided with a frictional engagement, each said frictional engagement being formed by slitting the end of said leg member to form a plurality of offset tongues and by positioning a receiver upon the clasp member to frictionally engage said offset tongues.

4. In an article of jewelry, a sub-combination comprising a clip having an ornamental face, a mounting member soldered to said face, a jaw member pivotally connected to said mounting member and a tubular member extending parallelly of the pivotal connection between the ornamental face and the jaw member rigid with said face to receive a mounting frame.

5. In an article of jewelry, a sub-combination comprising a clip having an ornamental face, a mounting member soldered to said face, a jaw member pivotally connected to said mounting member and a tubular member rigid with said face to receive a mounting frame, said tubular member being positioned adjacent and parallel to the pivotal connection between the jaw member and the mounting member and inside and between the jaw member and the ornamental face.

6. A brooch comprising a frame having an elongated member receiving a pin and catch combination and a plurality of leg members to frictionally engage clasp members, and clasp members in frictional engagement with said leg members, said clasp members having ornaments and jaw members pivotally connected thereto and also having receiver means extending parallelly of the pivotal connections between the jaw members and the ornaments to engage said leg members.

7. A brooch comprising a T-frame with a plurality of closely spaced parallel legs constituting the vertical stem of the T-frame and a pair of clips removably mounted back to back upon said legs with aligned longitudinal axes, said clips and said legs being provided with frictional engagements with respect to each other, said engagements having axes transverse to said aligned longitudinal axes.

8. A brooch comprising a frame having a bar, receiving a pin and catch combination, and a plurality of outstanding legs, the ends of which legs are slit to form a plurality of offset tongues, a pair of clips provided with tubular members to be received on said legs and frictionally engage said tongues, said clip members being received on said tongues so that they will be in back to back relationship.

9. In a brooch, the combination with a frame having a plurality of legs, of a pair of clips, said clips each including a jaw member, a mounting member pivotally connected to said jaw member and an ornament soldered to said mounting member, and receiver members positioned adjacent to said mounting member and between said jaw and ornament members, said receiver members receiving said legs and means to afford a frictional engagement between said legs and said receiver members, said receiver members extending parallelly to the pivotal connection between the mounting member and the jaw member.

10. An article of jewelry comprising a frame member and a double clip assemblage received within said frame member, said double clip assemblage comprising an inside frame in two clips, each of said clips being provided with an ornament face and a jaw member, said jaw members engaging said frame member and being devoid of engagement with said inside frame, said inside frame being connected to said clips independently of said jaw members.

11. An article of jewelry comprising an outside frame member and an inside frame member and a pair of clips received upon said inside frame member and connected to said outside frame member, said clips having independent means respectively to engage said inside frame member and said outside frame member.

12. An article of jewelry comprising a T-frame member with a double leg construction and a pair of clips arranged in back to back relationship, each leg supporting one clip and an external ornamental frame member connected to said clips, each of said clips being provided with a jaw member and said jaw members engaging said external ornamental frame member and being devoid of engagement with said T-frame, said clips being provided with guideways positioned between said jaw members and said ornamental frame members for receiving said legs.

13. An article of jewelry comprising a frame member provided with a plurality of shoulders and recesses therein at opposite sides of the inside of the frame and a double clip combination including a plurality of clip members cooperating with said frame, said clip members each being provided with a pivotally connected jaw and ornament members, the ends of the ornament members being received in said shoulders and the ends of the jaw members being provided with teeth received in said recesses.

14. A jewelry unit assembly comprising a plurality or ornament parts positioned back to back with aligned longitudinal axes, a support and means for attaching said ornament parts to said support to make up an assembled ornamental unit, comprising a plurality of complemental sets of male means and elongated tubular female receiver means, one of each of said means being mounted on said support and one of each of said other means being mounted on the rear of each ornament part, said male and female means having axes transverse to said longitudinal axes.

15. In combination a pair of ornaments, each provided on its rear with a permanently attached elongated sheet metal complete enclosure channel member forming a guideway and a sheet metal frame member, having parallel extensions, slidable into the guideways to secure the ornaments in assembled position.

16. In combination, a pair of ornaments, each provided with a mounting member and a sheet metal slideway rigidly connected therewith, and a frame, carrying a pin and catch and having parallel outstanding arms, slidable into said slideways to position said ornaments back to back and form a brooch.

17. In an article of jewelry, two ornamental face members arranged back to back, each member being provided with a female element forming a slideway, the slideways on said members being arranged so that they extend in the same direction, a frame member to hold said ornamental face elements together, having parallel outwardly extending leg members, cooperating and received in said slideways and also at one side thereof carrying a pin and catch combination, which pin is positioned so as to extend parallel to the longitudinal axes of the ornamental face members when arranged back to back.

18. In combination, a pair of ornaments, each provided on its rear with a permanently attached elongated sheet metal female enclosure channel member forming a guideway and a sheet metal frame member, having parallel extensions, slidable into the guideways to secure the ornaments in assembled position.

19. A jewelry unit assembly comprising a plurality of ornament parts, a support and means for frictionally attaching said ornament parts to said support to make up an assembled ornamental unit, comprising a plurality of complemental sets of elongated sheet metal female enclosure channel means forming guide-ways and a plurality of parallel arm means slidable into said guideways to secure the ornaments in back to back assembled position, said arm means and channel means being of such a size that the arm means is frictionally retained within the sheet metal channel means without rigid locking means, one of each of said means forming part of the support and one of each of said other means being mounted on the rear of each ornament part.

20. A jewelry unit assembly comprising a plurality of ornament parts having aligned longitudinal axes, a support and means for attaching said ornament parts to said support against relative movement in any direction to make up an assembled ornamental unit, comprising a plurality of complemental sets of male means and elongated female receiver means, one of each of said means being mounted on said support and one of each of said other means being mounted on the rear of each ornament part, said female receiver means extending transversely to said longitudinal axes.

21. A jewelry unit assembly comprising a plurality of ornament parts having aligned longitudinal axes, a support and means for attaching said ornament parts to said support against relative movement in any direction to make up an assembled ornamental unit, comprising a plurality of complemental sets of male means and elongated female receiver means, said male means and female of each set being of such a size that the male means is frictionally retained within the female means and of such cross section to prevent relative turning movement, one of each of said means being mounted on the support and one of each of said other means being mounted on the rear of each ornament part, said female receiver means extending transversely to said longitudinal axes.

MAURICE HANDMAN.